(12) United States Patent
Kim et al.

(10) Patent No.: US 10,790,910 B2
(45) Date of Patent: Sep. 29, 2020

(54) OPTICAL MODULATOR-BASED TRANSMISSION CONTROL

(71) Applicant: Intel Corporation, Santa Clara, CA (US)

(72) Inventors: Hyoung-Jun Kim, Santa Clara, CA (US); Hwee Chin Ong, San Jose, CA (US); Sang Yup Kim, Sunnyvale, CA (US); Raghuram Narayan, Newark, CA (US); Jeffrey B. Driscoll, San Jose, CA (US); Woosung Kim, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/231,464

(22) Filed: Dec. 22, 2018

(65) Prior Publication Data

US 2019/0149241 A1    May 16, 2019

(51) Int. Cl.
| | | |
|---|---|---|
| *H04B 10/564* | (2013.01) | |
| *H04B 10/516* | (2013.01) | |
| *G02F 1/21* | (2006.01) | |
| *H04B 10/572* | (2013.01) | |
| *G02F 1/225* | (2006.01) | |
| *G02F 1/01* | (2006.01) | |

(52) U.S. Cl.
CPC ......... *H04B 10/516* (2013.01); *G02F 1/0123* (2013.01); *G02F 1/21* (2013.01); *G02F 1/225* (2013.01); *H04B 10/572* (2013.01); *G02F 2001/212* (2013.01); *G02F 2201/58* (2013.01); *H04B 10/564* (2013.01)

(58) Field of Classification Search
None
See application file for complete search history.

(56) References Cited

U.S. PATENT DOCUMENTS

| | | | | |
|---|---|---|---|---|
| 6,334,004 | B1* | 12/2001 | Ohkuma | G02F 1/0123 385/2 |
| 6,400,490 | B1* | 6/2002 | Hosoi | G02F 1/225 359/254 |
| 8,121,492 | B2* | 2/2012 | Akiyama | H04B 10/5051 398/182 |
| 9,407,361 | B1* | 8/2016 | Zhang | H04B 10/07955 |
| 9,496,962 | B1* | 11/2016 | Wang | H04B 10/5053 |
| 9,684,220 | B2* | 6/2017 | Beatty | G02F 1/225 |
| 9,835,928 | B1* | 12/2017 | Shen | H04B 10/50575 |
| 9,859,985 | B2* | 1/2018 | Akiyama | H04B 10/50577 |
| 9,935,716 | B2* | 4/2018 | Park | H04B 10/516 |

(Continued)

OTHER PUBLICATIONS

Sackinger, Eduard, Broadband Circuits for Optical Fiber Communication, 2002, pp. 3-4 (Year: 2002).*

*Primary Examiner* — Jai M Lee
(74) *Attorney, Agent, or Firm* — Patent Capital Group

(57) ABSTRACT

Embodiments may relate to an optical modulator system. The optical modulator system may include a first photodiode to measure a first optical level at an output of a Mach-Zehnder modulator (MZM). The system may further include a second photodiode to measure a second optical level at a termination of the MZM. The system may further include a logic coupled with the first photodiode and the second photodiode, the logic to identify a modulator bias that minimizes the first optical level. Other embodiments may be described or claimed.

16 Claims, 6 Drawing Sheets

(56) References Cited

U.S. PATENT DOCUMENTS

| | | | |
|---|---|---|---|
| 9,960,854 B2* | 5/2018 | Krasulick | H04B 10/5561 |
| 10,063,322 B2* | 8/2018 | Akiyama | H04B 10/0795 |
| 10,191,306 B2* | 1/2019 | Griffin | G02F 1/0123 |
| 10,345,673 B2* | 7/2019 | Fan | H04B 10/50575 |
| 2002/0005975 A1* | 1/2002 | Nakamoto | G02F 1/0121 |
| | | | 359/254 |
| 2006/0034616 A1* | 2/2006 | Tipper | H04B 10/505 |
| | | | 398/186 |
| 2007/0212075 A1* | 9/2007 | Yin | G02F 1/0123 |
| | | | 398/183 |
| 2008/0175598 A1* | 7/2008 | Cho | G02F 1/0123 |
| | | | 398/183 |
| 2009/0086303 A1* | 4/2009 | Ide | H04B 10/5561 |
| | | | 359/279 |
| 2009/0115544 A1* | 5/2009 | Kershteyn | H04L 27/2096 |
| | | | 332/103 |
| 2009/0141333 A1* | 6/2009 | Tsunoda | H04B 10/5561 |
| | | | 359/279 |
| 2011/0293276 A1* | 12/2011 | Takahara | H04B 10/5053 |
| | | | 398/65 |
| 2012/0288284 A1* | 11/2012 | Yoshida | H04B 10/50595 |
| | | | 398/186 |
| 2013/0141772 A1* | 6/2013 | Jiang | H04B 10/50575 |
| | | | 359/276 |
| 2013/0306848 A1* | 11/2013 | Dell'Orto | G02F 1/2255 |
| | | | 250/227.11 |
| 2014/0010530 A1* | 1/2014 | Goebuchi | H04J 14/06 |
| | | | 398/25 |
| 2014/0029956 A1* | 1/2014 | Le Taillandier De Gabory | |
| | | | G02F 1/0123 |
| | | | 398/186 |
| 2014/0363175 A1* | 12/2014 | Yamanaka | H04B 10/5053 |
| | | | 398/183 |
| 2015/0050030 A1* | 2/2015 | Le Taillandier De Gabory | |
| | | | H04B 10/564 |
| | | | 398/183 |
| 2015/0110436 A1* | 4/2015 | Smith | G02F 1/225 |
| | | | 385/2 |
| 2015/0171971 A1* | 6/2015 | Enoki | H04B 10/50575 |
| | | | 398/183 |
| 2015/0236792 A1* | 8/2015 | Sugihara | H04B 10/516 |
| | | | 398/183 |
| 2016/0105244 A1* | 4/2016 | Akiyama | H04B 10/50572 |
| | | | 398/186 |
| 2016/0110436 A1* | 4/2016 | Romano | G06F 16/254 |
| | | | 707/602 |
| 2018/0074348 A1* | 3/2018 | Fujita | H04B 10/541 |
| 2018/0173023 A1* | 6/2018 | Streshinsky | G02F 1/011 |
| 2018/0241474 A1* | 8/2018 | Sadagopan | H04B 10/564 |
| 2018/0267340 A1* | 9/2018 | Rohde | G02F 1/225 |
| 2018/0267384 A1* | 9/2018 | Padmaraju | G02F 1/0123 |
| 2019/0158187 A1* | 5/2019 | Koga | G02F 1/01 |

\* cited by examiner

OPTICAL MODULATOR-BASED TRANSMISSION CONTROL

BACKGROUND

Optical or electrical interconnect systems may benefit from functionalities of transmission (Tx) disable or Tx squelch to turn off output powers (or component powers) for various use cases. Especially, for the optical interconnect, the output signal may be considered to be the optical signal generated by one or more lasers of the interconnect system.

In this use case, the output optical power may be reduced by turning off the lasers. However, the de-assert time of this technique may be limited by the turn-on response time of the same lasers. Additionally, this technique may only be applicable to transmitter architectures that share a single laser for multiple channels.

DETAILED DESCRIPTION

Figure 1:
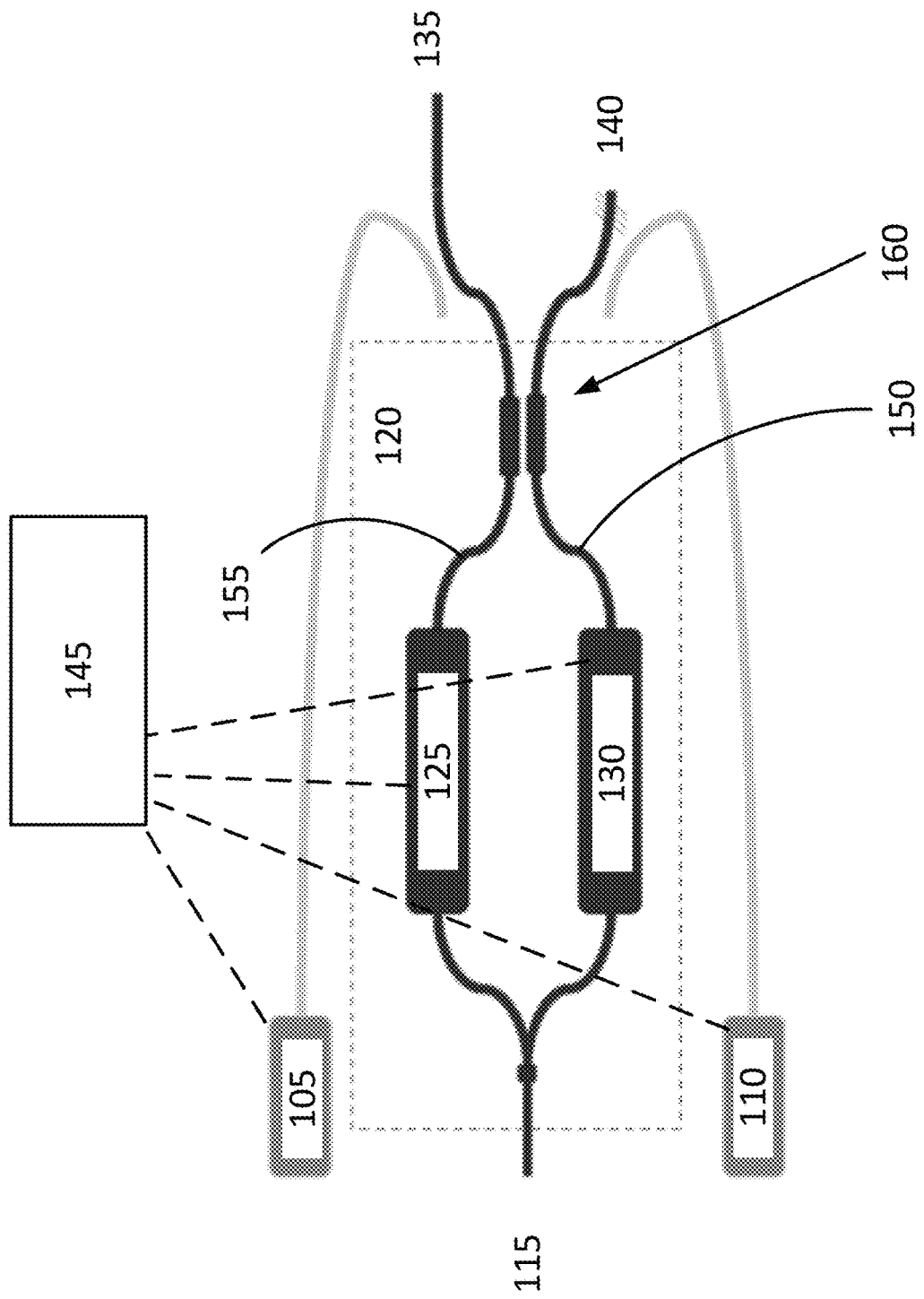
FIG. 1 depicts an example architecture of an optical modulator system, in accordance with various embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Various operations may be described as multiple discrete operations in turn, in a manner that is most helpful in understanding the claimed subject matter. However, the order of description should not be construed as to imply that these operations are necessarily order dependent.

Embodiments herein may be described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise.

Generally, embodiments herein may relate to the use of optical modulators to reduce the output optical power for Tx disable or squelch. As used herein, Tx disable may refer to disablement of transmit functionality regardless of whether there is input data to be transmitted, and Tx squelch may refer to disablement of transmit functionality when there is no input data to be transmitted. Generally, embodiments herein may have three to five times faster de-assert time than legacy techniques. Additionally, embodiments herein may be more robust than legacy techniques.

Generally, embodiments herein may relate to use of an optical modulator to reduce output optical power during Tx disable or squelch. Specifically, embodiments herein may relate to use of the optical modulator in a Mach-Zehnder modulator (MZM). An example of such an MZM with reduced optical power during Tx disable or squelch is depicted in FIG. 1.

Specifically, FIG. 1 depicts an example architecture of an optical modulator system, in accordance with various embodiments. Specifically, the optical modulator system may include an MZM. 120. The MZM 120 may be coupled with an input 115 by which an unmodulated optical signal may be provided by a light source such as a laser. The input 115 may then optically coupled with two waveguides 150 and 155. Each of the waveguides 150 and 155 may have an optical phase modulator 125 and 130. The modulators 125 and 130 may be configured to modulate the optical signal to encode data into the signal. Specifically, modulator 125 may modulate the optical signal in the waveguide 155, and modulator 130 may modulate the optical signal in waveguide 150. In this embodiment, the modulators 125 and 130 may be referred to as "data modulators." In other embodiments, the modulators 125 and 130 may be configured to alter a modulation bias of the MZM, as described below. In this embodiment, the modulators 125 and 130 may be referred to as "bias modulators." In some embodiments, a single modulator 125 or 130 may act as both a bias modulator and a data modulator.

The waveguides 150 and 155 may then join at optical coupling region 160, where the modulated optical signals in waveguides 150 and 155 may constructively or destructively interfere with one another to form a modulated signal. The resultant modulated signal may be output at output 135, which may be coupled with waveguide 155 as shown. Waveguide 150 may end at termination 140.

In embodiments herein, the optical modulator system may include photodiodes 105 and 110. As can be seen, photodiode 105 may be optically coupled with the waveguide 155 at the output 135. Additionally, photodiode 110 may be optically coupled with the waveguide 150 at the termination

140. Generally, the photodiodes 105 and 110 may be configured to measure the optical output of the waveguide 155 and 150, respectively. More specifically, photodiode 105 may be configured to measure the intensity of light within waveguide 155, and the intensity may be referred to herein as "MPD1." Photodiode 110 may be configured to measure the intensity of light within waveguide 150, and the intensity may be referred to herein as "MPD2." Photodiodes 105 and 110 may be communicatively coupled with a logic 145, which may be configured to perform one or more processing functions on the data provided by the photodiodes 105 and 110 related to the intensity of light at the two MZM outputs coupled with waveguides 150 and 155. Additionally, logic 145 may be communicatively coupled with modulators 125 and 130. Specifically, logic 145 may be configured to alter the bias of one or both of modulators 125 and 130 as will be described in greater detail below.

Figure 2:
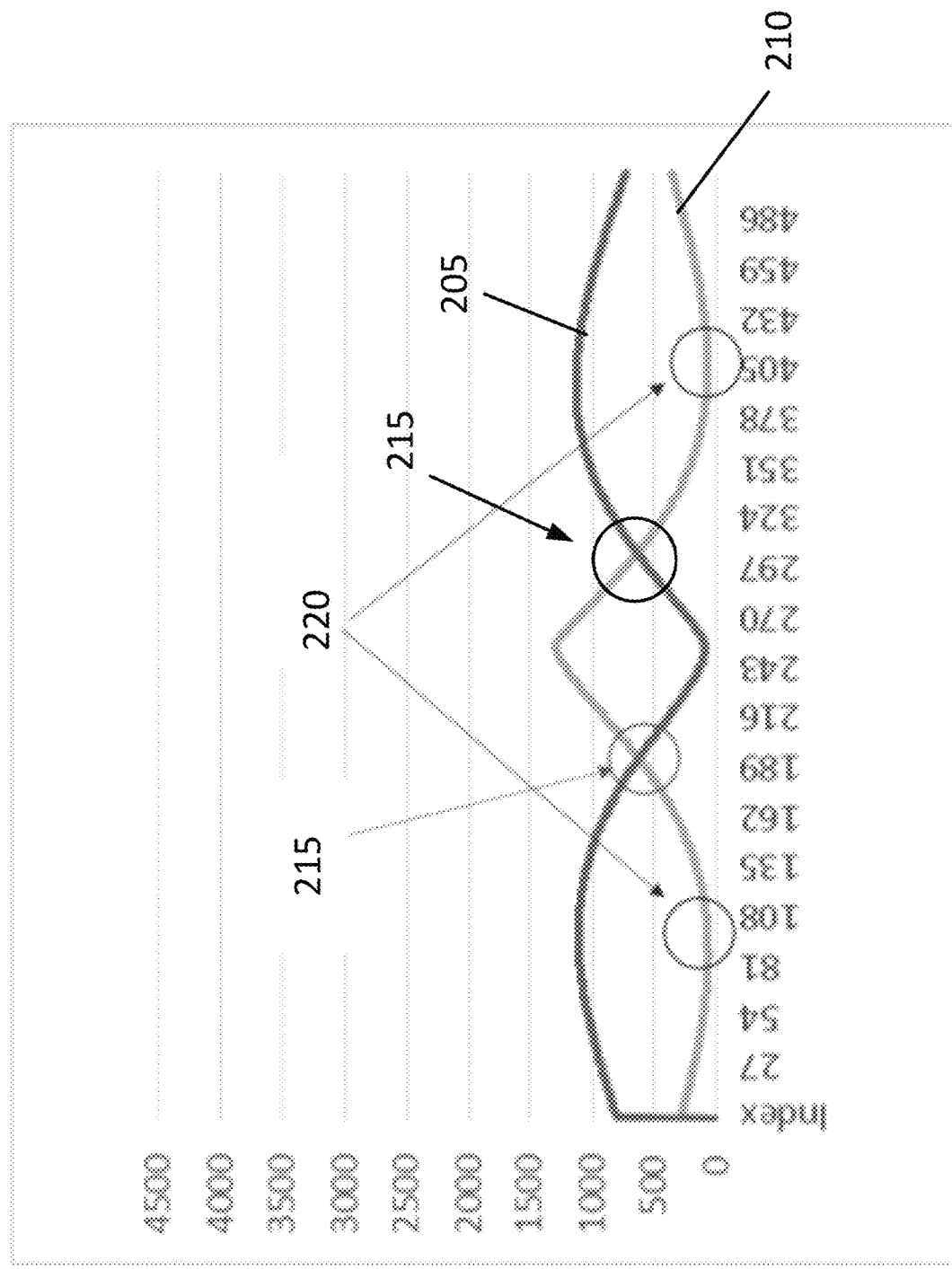
FIG. 2 depicts an example graph of optical power at two outputs of Mach-Zehnder modulator (MZM) of FIG. 1, in accordance with various embodiments.

Generally, in legacy embodiments, the logic 145 may provide a modulator bias to one or both of modulators 125 and 130. The modulator bias may be a direct current (DC) voltage that provides a baseline voltage around which the modulating voltage is applied by the modulators 125 or 130. FIG. 2 depicts an example graph of optical power at the inputs of photodiodes 105 and 110, in accordance with various embodiments. Specifically, the x-axis of FIG. 2 may depict indices of modulator bias. Generally, the indices may be unitless, and may represent optical phase difference between the two optical paths coupled with the modulators 125/130. By contrast, the y-axis may depict optical power measured in units of "counts" or occurrences as measured by the photodiode 105. Generally, line 210 may correspond to measurements of optical intensity taken by photodiode 105 at different modulating biases, and line 205 may correspond to measurements of optical intensity taken by photodiode 110 at different modulating biases.

In legacy systems, the modulating bias may be set by logic 145, and particularly by digital to analog converter (DAC) of the logic 145, at the quadrature point 215. Generally, the quadrature point 215 may refer to the modulating bias wherein the optical intensity of the optical output at output 135 and termination 140 are generally equal. FIG. 2 may generally include two quadrature points 215, one at an index of approximately 189, and one at an index of approximately 297.

However, as can be seen in FIG. 2, as the modulator bias is varied, the output optical power of the output 135 and the termination 140 may be increased or decreased due to constructive or destructive interference of the optical signals from the two waveguides 150 and 155 at the optical coupling region 160. In embodiments herein, the output optical power of waveguide 155, that is, the waveguide coupled with the output 135, may be effectively minimized by shifting the modulator bias. Specifically, if logic 145 sets the modulator bias at minimum transmission points 220, the output optical power at output 135 may be effectively minimized. Minimization of the output power at output 135 may effectively result in Tx disablement or squelch. As can be seen in FIG. 2, there may generally be two minimum transmission points 220, one at an index of approximately 100, and one at an index of approximately 405. It will be understood that these numbers given with respect to the indices of the modulator biases for quadrature points 220 and minimum transmission points 220 are intended as examples for the sake of reference to the Figure, and are not intended as providing specific values.

It will be noted that this technique may be applicable to the architecture depicted in FIG. 1 using different external optical modulators. For example, modulators such as ring modulators, electro-absorption modulators, etc. may be used because the modulators may typically have a low optical transmission point. However, in these embodiments, the control algorithm used may be different due to the different modulation mechanisms or control techniques of the associated modulators. However, the below described technique may provide one example technique by which a modulator such as modulators 125 or 130 may be used to provide Tx disablement or squelch functionality.

Generally, the technique may relate to an algorithm, implemented by logic 145, that dynamically tracks the optimum modulator bias point for Tx disable or squelch through a feedback loop. Thus, the technique may provide robustness to optimum bias point drift due to temperature or aging. Additionally, this technique may not require production calibration, and may not increase test time or cost related to use of the MZM. The algorithm in full may be depicted in FIGS. 3-5, and is split across the Figures for the sake of clarity of illustration.

Generally, this technique may be discussed at a high level as having four general elements. The first element may be for logic 145 to shift the modulator bias from the quadrature point 215 to one of the minimum transmission points 220 to provide Tx disable/squelch functionality. Specifically, the technique may include determining the direction to shift the bias based on the slope of the transfer curve. In other words, the optical phase difference between the two optical paths coupled with waveguides 150 and 155 may be increased or decreased by logic 145 directing a shift in the modulator bias. Generally, the difference may be altered until the ratio of MPD2 to (MPD1+MPD2) ("the ratio") reaches a specific threshold, for example 95% or some other threshold.

Figure 3:
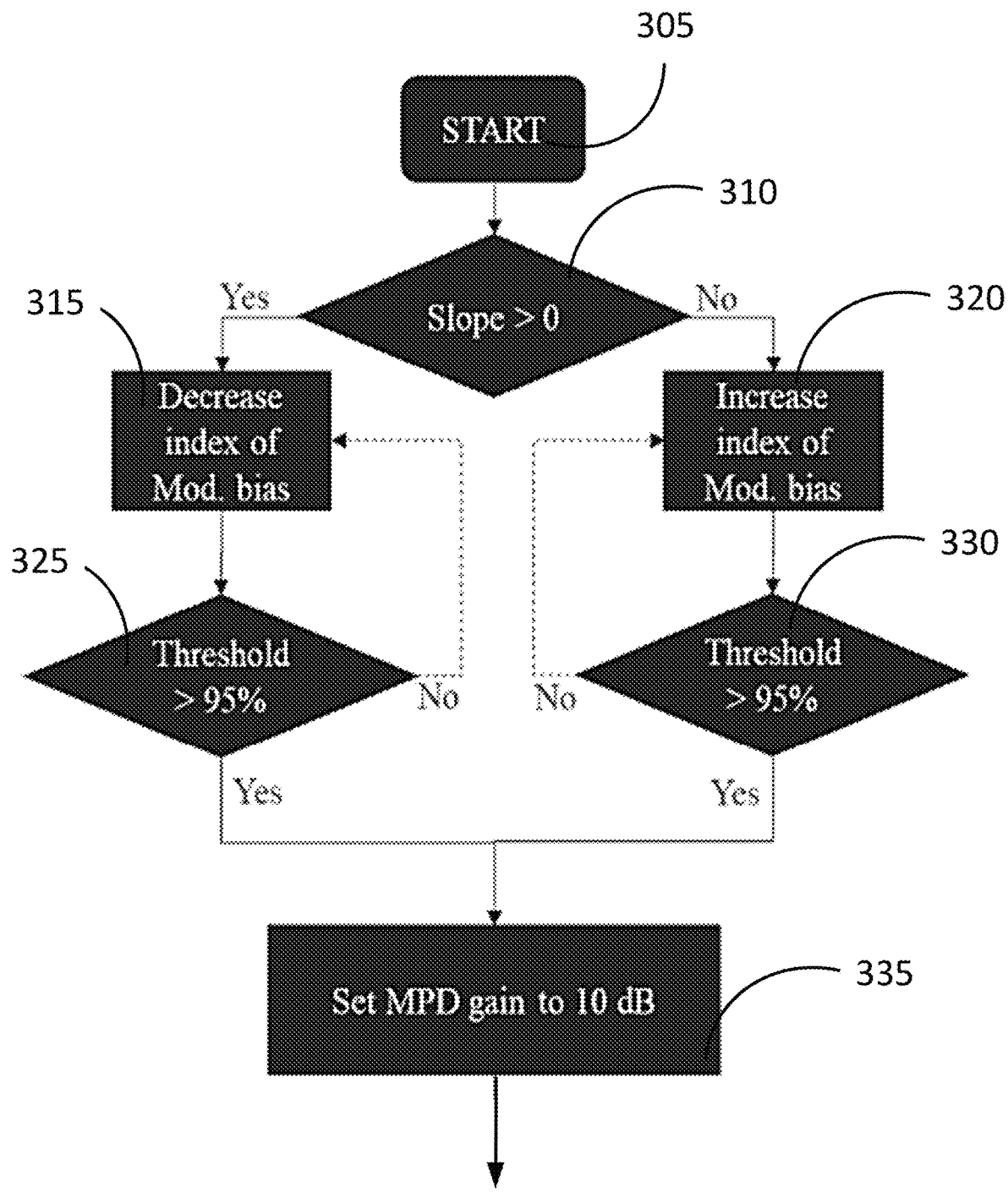
FIG. 3 depicts a first portion of an example technique of controlling optical output power, in accordance with various embodiments.

Generally, this first portion of the technique is illustrated in FIG. 3. Specifically, the technique may begin at 305. It may be assumed that the technique may begin with the logic 145 setting the modulator bias at one of the quadrature points 215.

The logic 145 may then identify, at 310, whether the slope of the line 210 is positive or negative. For example, if the index is set at approximately 189 in FIG. 2, then the modulator bias may be at the leftmost quadrature point 215. In this case, the slope of line 210 may be considered to be positive (e.g., rising from left to right). By contrast, if the index is set at approximately 297, then the modulator bias may be at the rightmost quadrature point 215. In this case, the slope of the line 210 may be considered to be negative (e.g., decreasing from left to right).

If the slope of the line is determined at 310 to be greater than 0, then the technique may continue to element 315 where the logic 145 may decrease the index of the modulator bias. As can be seen in FIG. 2, if the index of the modulator bias is reduced from 189 to 162 for example, then MPD1 may be reduced. The logic 145 may then check at 325 whether the ratio is greater than a given threshold. If the ratio is not greater than the threshold, then the technique may return to element 315 and elements 315/325 may be iterated until the ratio is above the desired threshold. Being above this threshold may indicate, for example, that the index of the modulator bias has moved from the leftmost quadrature point 215 (e.g. the quadrature point 215 with an approximate index of 189) to within a desired range of the leftmost minimum transmission point 220 (e.g., the minimum transmission point 215 with an approximate index of 108).

Similarly, if the slope of the line is determined at 310 to be less than 0, then the technique may continue to element 320 where the logic 145 may increase the index of the modulator bias. As can be seen in FIG. 2, if the index of the modulator bias is reduce from 297 to 324 for example, then MPD1 may be reduced. The logic 145 may then check at 325 whether the ratio is greater than the above-described threshold. If the ratio is not greater than the threshold, then the technique may return to element 320 and elements 320/330 may be iterated until the ratio is above the desired threshold. Being above this threshold may indicate, for example, that the index of the modulator bias has moved from the rightmost quadrature point 215 (e.g., the quadrature point 215 with an approximate index of 297) to within a desired range of the rightmost minimum transmission point 220 (e.g., the minimum transmission point 220 with an index of approximately 405).

As discussed above, in some embodiments the threshold value used for the ratio at 325 and 330 may be approximately 95%. However, in other embodiments the threshold value may be higher or lower. For example, in some embodiments the specific threshold value used may be based on the baseline intensity of the light within the MZM 120, the responsivity of the photodiodes 105/110, or some other factor. In some embodiments, the threshold used at 325 may be different than the threshold used at 330. Additionally, the reduction or increase of the index of the modulator bias may be based on a variety of step sizes. For example, in some embodiments the index may be decreased at 315 or increased at 320 using a coarse step size of between approximately 10 and approximately 20 counts. However, in other embodiments the step size may be larger or smaller. The choice of the step size may be based on, for example, time or power considerations of the MZM 120, the current modulator bias, etc.

The second portion of the technique may be to increase, by the logic 145, gain of the signal output by photodiode 105 by approximately 10 decibels (dB), which may result in boosting the signal directed from MPD1. Specifically, the signal (i.e., the "count") may be received by logic 145 from photodiode 105, and an amplifier of the logic 145 may increase the gain of the signal by approximately 10 dB. In some embodiments, the logic 145 may also increase the gain of the signal received from photodiode 110. It may be desirable to boost the gain of the signals (i.e., boosting the gain of the amplifier(s) of logic 145 that are processing the signals from photodiodes 105 or 110) to, for example, improve a signal to noise ratio. In some embodiments, the starting gain of the amplifiers may be approximately 0 dB, while in other embodiments the starting gain of the amplifiers may be larger or smaller. Without this increased gain, the value of MPD1 may be very low, and so the logic may be unable to accurately process the signal received from photodiode 105. For example, the signal to noise ratio measured by the photodiode 105 may be relatively low unless the signal itself is boosted.

FIG. 3 depicts an example of this portion of the technique. Specifically, the logic 145 may set, at 335, the amplifier gain to 10 dB. As noted above, in some embodiments this may include just setting the gain at 10 dB, while in other embodiments this may relate to increasing the gain of the amplifier by 10 dB. The technique may then proceed from element 335 of FIG. 3 to element 405 of FIG. 4.

Figure 4:
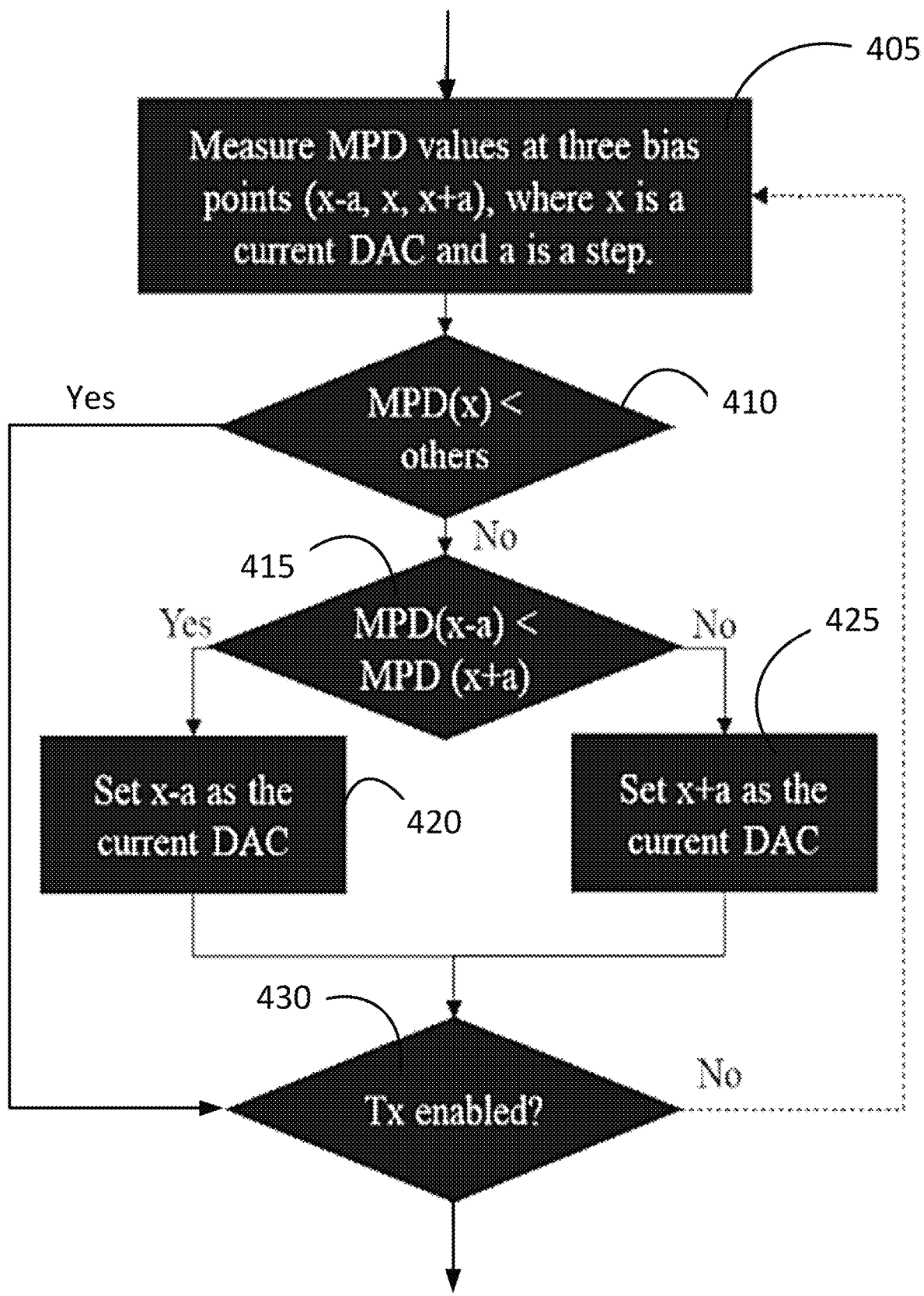
FIG. 4 depicts a second portion of the technique of controlling optical output power, in accordance with various embodiments.

FIG. 4 may generally relate to the third portion of the technique, which may relate to identifying the minimum transmission point 220 by dithering the index of the modulation bias and monitoring the values of MPD1 and MPD2. Specifically, this portion of the technique may include measuring, at 405, the MPD values at three different modulation bias points. The three bias points may be considered as x−a, x, and x+a. "x" may be the current setting of the DAC of the logic 145. That is, "x" may refer to the current index of the modulation bias. "a" may refer to the step size being used. In other words, MPD1 and MPD2 may be measured at three different indices—the current modulation bias, and then the modulation bias plus or minus a step size. In embodiments, the step size "a" may be, for example, the same step size as used above for elements 315 or 320. In other embodiments, the step size "a" may be larger or smaller than the step size described above with respect to elements 315 or 320. For example, in some embodiments the step size "a" may be a fine step size, wherein a is between 1 and approximately 5 counts.

The logic may then identify, at 410, whether the value of MPD1 at the index "x" is less than the value of MPD1 at the modulation bias index of x+a or x−a. If MPD1 at the index "x" is less than the value of MPD1 at either of the other two indices, then the technique may proceed to 430.

However, if the logic 145 identifies at 410 that MPD1 at index "x" is not less than either of the other two index values x+a or x−a, then the logic 145 may identify at 415 whether MPD1 at x−a is less than MPD1 at x+a at 415. If MPD1 at x−a is less than MPD1 at x+a, then the index x−a may be set as the current DAC value at 420. If MPD1 at x−a is greater than MPD1 at x+a, then the index x+a may be set as the current DAC value at 425. That is, whichever index x−a or x+a results in a lower value for MPD1 may be set as the modulation bias. Generally, the selected value may correspond to one of minimum transmission points 215 of FIG. 2. At this time in the technique, because the modulation bias is set at the minimum transmission point 215, then Tx disable or Tx squelch may be enacted. In other words, because the modulation index is set at a stage where MPD1 is so low, the signal may be effectively "off" as seen at output 135.

Figure 5:
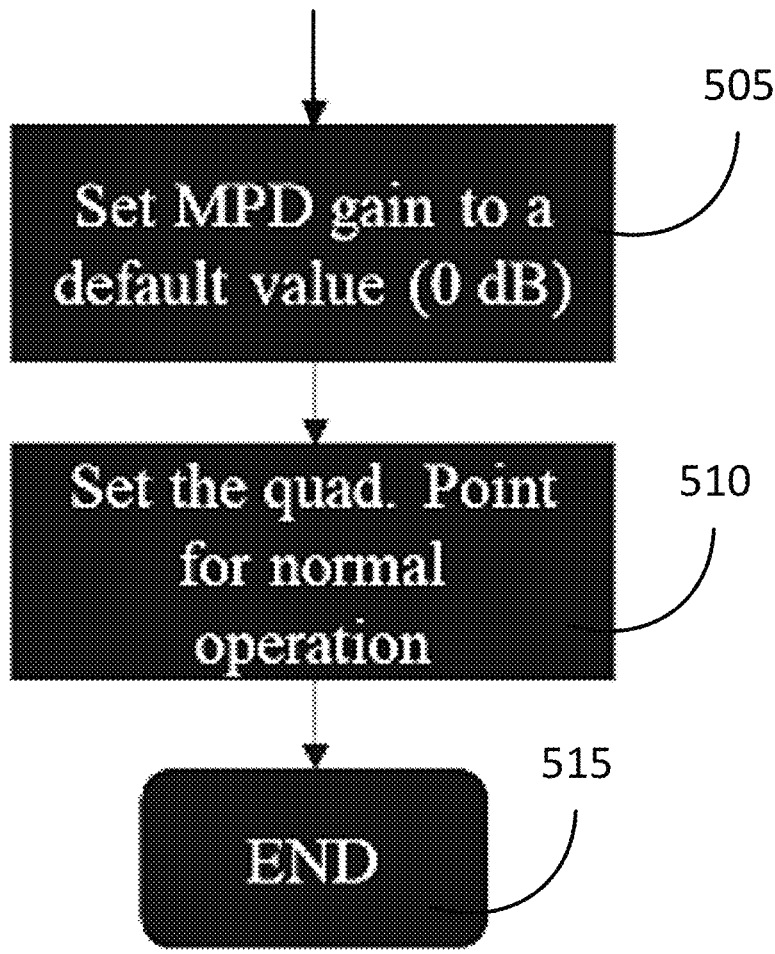
FIG. 5 depicts a third portion of the technique of controlling optical output power, in accordance with various embodiments.

The final portion of the technique may be seen in FIGS. 4 and 5. Specifically, the final portion of the technique may include setting the MPD1 gain back to the default value, and setting the modulation bias back to the quadrature point when Tx is re-enabled. Resetting the gain and the modulation bias may effectively end the Tx disablement or the Tx squelch, and re-enable transmission of the MZM 120.

This portion of the technique may include identifying, at 430 by logic 145, whether Tx is enabled at 430. The Tx may be enabled by, for example, a user of the MZM 120, or some other signal from the logic 145. If Tx is not enabled at 430, then the remaining elements of FIG. 4 may be re-performed. However, if Tx is enabled at 430, then the technique may continue to FIG. 5 Specifically, the gain of the photodiode 105 may be reset at 505 so that the gain of amplifier is back to a default value (e.g., 0 dB). The reset of the gain may be desirable to prevent saturation of the signal at the analog-to-digital convertor of logic 145. Additionally, the modulation bias may be set back to the quadrature point at 510. Specifically, the modulation bias may be set back to, for example, the quadrature points 215 of FIG. 2. By setting the modulation bias back to the quadrature points, normal Tx operation may be optimized. Finally, the technique may end at 515.

It will be understood that the above described technique is intended only as one example. Some embodiments of the technique may include the above described elements in a different order, or some elements may not be present. For example, in some embodiments certain elements such as elements 505 or 510 may be performed in a different order than depicted, or simultaneously with one another. In some embodiments, certain elements such as element 505 may not be present. Other embodiments may have other variations.

Figure 6:
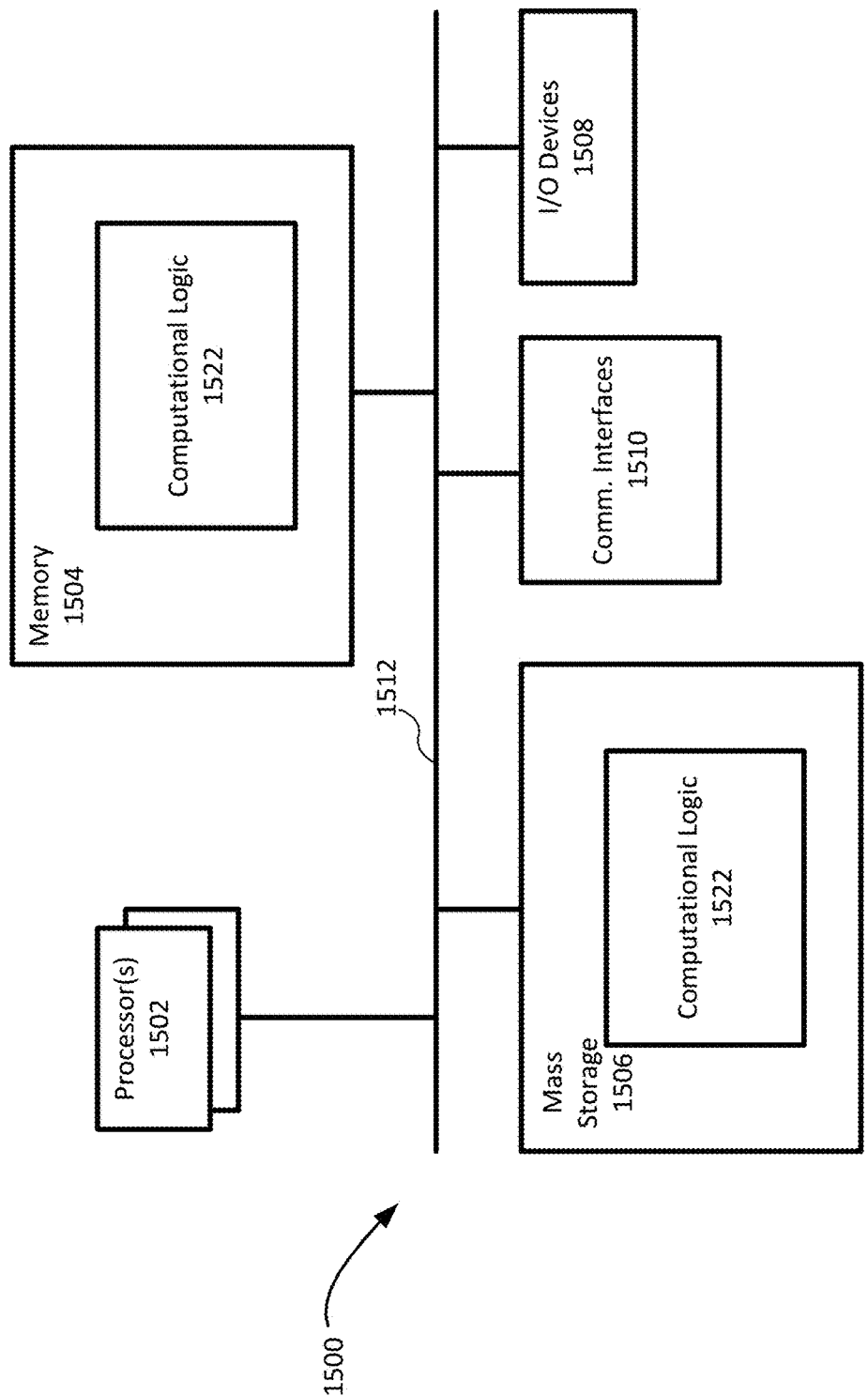
FIG. 6 illustrates an example device that may use various embodiments herein, in accordance with various embodiments.

FIG. 6 illustrates an example computing device 1500 suitable for use with the optical modulator system of FIG. 1, in accordance with various embodiments. Specifically, in some embodiments, the computing device 1500 may include one or more of the described optical modulator systems therein.

As shown, computing device 1500 may include one or more processors or processor cores 1502 and system memory 1504. For the purpose of this application, including the claims, the terms "processor" and "processor cores" may be considered synonymous, unless the context clearly requires otherwise. The processor 1502 may include any type of processors, such as a CPU, a microprocessor, and the like. The processor 1502 may be implemented as an integrated circuit having multi-cores, e.g., a multi-core microprocessor. The computing device 1500 may include mass storage devices 1506 (such as diskette, hard drive, volatile memory (e.g., DRAM, compact disc read-only memory (CD-ROM), digital versatile disk (DVD), and so forth)). In general, system memory 1504 and/or mass storage devices 1506 may be temporal and/or persistent storage of any type, including, but not limited to, volatile and non-volatile memory, optical, magnetic, and/or solid state mass storage, and so forth. Volatile memory may include, but is not limited to, static and/or DRAM. Non-volatile memory may include, but is not limited to, electrically erasable programmable read-only memory, phase change memory, resistive memory, and so forth. In some embodiments, one or both of the system memory 1504 or the mass storage device 1506 may include computational logic 1522, which may be configured to implement or perform, in whole or in part, one or more instructions that may be stored in the system memory 1504 or the mass storage device 1506. In other embodiments, the computational logic 1522 may be configured to perform a memory-related command such as a read or write command on the system memory 1504 or the mass storage device 1506.

The computing device 1500 may further include input/output (I/O) devices 1508 (such as a display (e.g., a touchscreen display), keyboard, cursor control, remote control, gaming controller, image capture device, and so forth) and communication interfaces 1510 (such as network interface cards, modems, infrared receivers, radio receivers (e.g., Bluetooth), and so forth).

The communication interfaces 1510 may include communication chips (not shown) that may be configured to operate the device 1500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1510 may operate in accordance with other wireless protocols in other embodiments.

The computing device 1500 may further include or be coupled with a power supply. The power supply may, for example, be a power supply that is internal to the computing device 1500 such as a battery. In other embodiments the power supply may be external to the computing device 1500. For example, the power supply may be an electrical source such as an electrical outlet, an external battery, or some other type of power supply. The power supply may be, for example alternating current (AC), direct current (DC) or some other type of power supply. The power supply may in some embodiments include one or more additional components such as an AC to DC convertor, one or more downconverters, one or more upconverters, transistors, resistors, capacitors, etc. that may be used, for example, to tune or alter the current or voltage of the power supply from one level to another level. In some embodiments the power supply may be configured to provide power to the computing device 1500 or one or more discrete components of the computing device 1500 such as the processor(s) 1502, mass storage 1506, I/O devices 1508, etc.

The above-described computing device 1500 elements may be coupled to each other via system bus 1512, which may represent one or more buses. In the case of multiple buses, they may be bridged by one or more bus bridges (not shown). Each of these elements may perform its conventional functions known in the art. The various elements may be implemented by assembler instructions supported by processor(s) 1502 or high-level languages that may be compiled into such instructions.

The permanent copy of the programming instructions may be placed into mass storage devices 1506 in the factory, or in the field, through, for example, a distribution medium (not shown), such as a compact disc (CD), or through communication interface 1510 (from a distribution server (not shown)). That is, one or more distribution media having an implementation of the agent program may be employed to distribute the agent and to program various computing devices.

The number, capability, and/or capacity of the elements 1508, 1510, 1512 may vary, depending on whether computing device 1500 is used as a stationary computing device, such as a set-top box or desktop computer, or a mobile computing device, such as a tablet computing device, laptop computer, game console, or smartphone. Their constitutions are otherwise known, and accordingly will not be further described.

In various implementations, the computing device 1500 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1500 may be any other electronic device that processes data.

In some embodiments, as noted above, computing device 1500 may include one or more of the described optical modulator systems. For example, in some embodiments an element such as a processor 1502 may include an optical modulator system, and may use that optical modulator system to communicate with another component of the computing device 1500 (e.g., mass storage 1506). In some embodiments, that communication may occur over system bus 1512. In other embodiments, an outward-facing component of the computing device 1500 such as a communication interface 1510 may include one or more of the optical modulator systems, and may use that system to communicate with another device that is communicatively coupled with the computing device 1500.

Examples of Various Embodiments

Example 1 includes an optical modulator system comprising: a first photodiode to measure a first optical level at an output of a Mach-Zehnder modulator (MZM); a second photodiode to measure a second optical level at a termination of the MZM; and a logic coupled with the first photodiode and the second photodiode, the logic to identify a modulator bias that minimizes the first optical level.

Example 2 includes the optical modulator system of example 1, wherein the modulator bias is a first modulator bias, and wherein the logic is further to identify, based on a change in environmental conditions, a second modulator bias that minimizes the first optical level.

Example 3 includes the optical modulator system of example 1, wherein the MZM includes: an input coupler; an output coupler optically coupled with the output and the termination; a first waveguide with a first modulator, wherein the first waveguide is optically coupled with, and positioned between, the input coupler and the output coupler; and a second waveguide with a second modulator, wherein the second waveguide is optically coupled with, and positioned between, the input coupler and the output coupler.

Example 4 includes the optical modulator system of any of examples 1-3, or some other example herein, wherein the logic is to incrementally alter the modulator bias to identify the modulator bias that minimizes the first optical level.

Example 5 includes the optical modulator system of example 4, wherein the logic is to use, as a starting point to incrementally alter the modulator bias, a modulator bias wherein the first optical level and the second optical level are equivalent.

Example 6 includes the optical modulator system of any of examples 1-3, or some other example herein, wherein the logic is to identify the modulator bias that minimizes the first optical level based on a step size used to alter the modulator bias.

Example 7 includes the optical modulator system of any of examples 1-3, or some other example herein, wherein the logic is further to: identify a measured first optical level received from the first photodiode; identify a measured second optical level received from the second photodiode; increase a gain of the measured first optical level or the measured second optical level to provide an increased-gain measurement; and identify the modulator bias based on the increased-gain measurement.

Example 8 includes a method of identifying a modulator bias to be used by a modulator of a Mach-Zehnder modulator (MZM), the method comprising: identifying, by a logic communicatively coupled with the MZM, a first optical level measured by a first photodiode that is coupled with an output of the MZM; identifying, by the logic, a second optical level measured by a second photodiode that is coupled with a termination of the MZM; identifying, by the logic based on the first optical level and the second optical level, a minimizing modulator bias that is to minimize the first optical level; and biasing, by the logic based on the minimizing modulator bias, the modulator of the MZM.

Example 9 includes the method of example 8, wherein the minimizing modulator bias is a first minimizing modulator bias, and further comprising: identifying, by the logic, a second minimizing modulator bias of the MZM that has a difference from the first minimizing modulator bias, and the difference is based on environmental condition changes; and biasing, by the logic based on the second minimizing modulator bias, the modulator of the MZM.

Example 10 includes the method of examples 8 or 9, or some other example herein, wherein the logic is to incrementally alter the modulator bias to identify the minimizing modulator bias.

Example 11 includes the method of example 10, wherein the logic is to incrementally alter the modulator bias based on a starting modulator bias wherein the first optical level and the second optical level are equivalent.

Example 12 includes the method of example 11, wherein the logic is to identify a direction in which to alter the modulator bias based on a slope of a plurality of measurements of an optical level measured by the first photodiode at a plurality of modulator biases that surround the starting modulator bias.

Example 13 includes the method of example 10, wherein the minimizing modulator bias is based on a step size used to incrementally alter the modulator bias.

Example 14 includes the method of example 10, further comprising: identifying, by the logic after an incremental altering of the modulator bias, a third optical level measured by the first photodiode; identifying, by the logic, that the third optical level is within a threshold of a minimized first optical level; and increasing, by the logic, a gain of the third optical level.

Example 15 includes the method of examples 8 or 9, or some other example herein, wherein biasing the modulator of the MZM includes altering, by the logic, an electrical value provided to the modulator.

Example 16 includes one or more non-transitory computer-readable media comprising instructions that, upon execution of the instructions by a logic that is communicatively coupled with a modulator of an optical transmission line, are to cause the logic to: identify that the optical transmission line is to enter a transmit disable or transmit squelch mode; identify a minimizing modulator bias that is to minimize an optical level of the optical transmission line at an output of the modulator; and set, based on the identification that the optical transmission line is to enter the transmit disable or transmit squelch mode, a modulator bias of the modulator to a minimizing modulator bias, wherein setting the modulator bias of the modulator to the minimizing modulator bias is to cause the optical transmission line to enter the transmit disable or transmit squelch mode.

Example 17 includes the one or more non-transitory computer-readable media of example 16, wherein the minimizing modulator bias is based on an environmental condition of the optical transmission line.

Example 18 includes the one or more non-transitory computer-readable media of example 16, wherein the instructions to identify the minimizing modulator bias include instructions to identify a first optical level measured by a first photodiode that is coupled with an output of the modulator; identify a second optical level measured by a second photodiode that is coupled with a termination of the modulator; and identify, based on the first optical level and the second optical level, the minimizing modulator bias that is to minimize the first optical level.

Example 19 includes the one or more non-transitory computer-readable media of example 18, wherein the instructions are further to incrementally alter the modulator bias based on a starting modulator bias wherein the data is modulated.

Example 20 includes the one or more non-transitory computer-readable media of any of examples 16-19, or some other example herein, wherein the instructions to identify the minimizing modulator bias include instructions to incrementally alter a modulator bias of the modulator.

Example 21 includes the one or more non-transitory computer-readable media of example 20, wherein the instructions are further to identify the minimizing modulator bias based on a step size used to incrementally alter the modulator bias.

Example 22 includes the one or more non-transitory computer-readable media of example 20, wherein the instructions are further to: identify, after an incremental alteration of the modulator bias, an optical level measured by the photodiode; identify that the optical level is within a threshold of a minimized optical level; and increase a gain of the optical level.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. An optical modulator system comprising:
    a first photodiode to measure a first optical level at an output of a Mach-Zehnder modulator (MZM), wherein the output is an output of a first waveguide of the MZM;
    a second photodiode to measure a second optical level at a termination of the MZM, wherein the termination is a termination of a second waveguide of the MZM; and
    a logic coupled with the first photodiode and the second photodiode, the logic to identify, based on the measurement of the first optical level and the measurement of the second optical level, a modulator bias that minimizes the first optical level; and
    wherein the logic is to identify the modulator bias that minimizes the first optical level based on a ratio of the measurement of the second optical level to a sum of the measurement of the first optical level and the measurement of the second optical level.

2. The optical modulator system of claim 1, wherein the modulator bias is a first modulator bias, and wherein the logic is further to identify, based on a change in environmental conditions, a second modulator bias that minimizes the first optical level.

3. The optical modulator system of claim 1, wherein the MZM includes:
    an input coupler;
    an output coupler optically coupled with the output and the termination;
    a first waveguide with a first modulator, wherein the first waveguide of the first modulator is optically coupled with, and positioned between, the input coupler and the output coupler; and a second waveguide with a second modulator, wherein the second waveguide of the second modulator is optically coupled with, and positioned between, the input coupler and the output coupler.

4. The optical modulator system of claim 1, wherein the logic is to incrementally alter the modulator bias to identify the modulator bias that minimizes the first optical level.

5. The optical modulator system of claim 4, wherein the logic is to use, as a starting point to incrementally alter the modulator bias, a modulator bias wherein the first optical level and the second optical level are equivalent.

6. The optical modulator system of claim 1, wherein the logic is to identify the modulator bias that minimizes the first optical level based on a step size used to alter the modulator bias.

7. The optical modulator system of claim 1, wherein the logic is further to:
    identify the measured first optical level received from the first photodiode; identify the measured second optical level received from the second photodiode;
    increase a gain of the measured first optical level or the measured second optical level to provide an increased-gain measurement; and
    identify the modulator bias based on the increased-gain measurement.

8. A method of identifying a modulator bias to be used by a modulator of a Mach-Zehnder modulator (MZM), the method comprising:
    identifying, by a logic communicatively coupled with the MZM, a first optical level measured by a first photodiode that is coupled with a first optical pathway that includes an output of the MZM;
    identifying, by the logic, a second optical level measured by a second photodiode that is coupled with a second optical pathway that includes a termination of the MZM;
    identifying, by the logic based on the first optical level and the second optical level, a minimizing modulator bias that is to minimize the first optical level, wherein the logic is to incrementally alter the modulator bias to identify the minimizing modulator bias;
    identifying, by the logic after an incremental altering of the modulator bias, a third optical level measured by the first photodiode;
    identifying, by the logic, that the third optical level is within a threshold of a minimized first optical level;
    increasing, by the logic, a gain of the third optical level; and
    biasing, by the logic based on the minimizing modulator bias, the modulator of the MZM.

9. The method of claim 8, wherein the minimizing modulator bias is a first minimizing modulator bias, and further comprising:
    identifying, by the logic, a second minimizing modulator bias of the MZM that has a difference from the first minimizing modulator bias, and the difference is based on environmental condition changes; and
    biasing, by the logic based on the second minimizing modulator bias, the modulator of the MZM.

10. The method of claim 8, wherein the logic is to incrementally alter the modulator bias based on a starting modulator bias wherein the first optical level and the second optical level are equivalent.

11. The method of claim 8, wherein the minimizing modulator bias is based on a step size used to incrementally alter the modulator bias.

12. The method of claim 8, wherein biasing the modulator of the MZM includes altering, by the logic, an electrical value provided to the modulator.

13. One or more non-transitory computer-readable media comprising instructions that, upon execution of the instructions by a logic that is communicatively coupled with a modulator of an optical transmission line, are to cause the logic to:
- identify that the optical transmission line is to enter a transmit disable or transmit squelch mode;
- identify a minimizing modulator bias that is to minimize an optical level of the optical transmission line at an output of the modulator, wherein the identification of the minimizing modulator bias is based on an incremental alteration of a modulator bias of the modulator;
- identify, after an incremental alteration of the modulator bias, an optical level measured by a photodiode;
- identify that the optical level is within a threshold of a minimized optical level;
- increase a gain of the optical level; and
- set, based on the identification that the optical transmission line is to enter the transmit disable or transmit squelch mode, the modulator bias of the modulator to a minimizing modulator bias, wherein setting the modulator bias of the modulator to the minimizing modulator bias is to cause the optical transmission line to enter the transmit disable or transmit squelch mode.

14. The one or more non-transitory computer-readable media of claim 13, wherein the minimizing modulator bias is based on an environmental condition of the optical transmission line.

15. The one or more non-transitory computer-readable media of claim 13, wherein the instructions to identify the minimizing modulator bias include instructions to identify a first optical level measured by a first photodiode that is coupled with an output of the modulator;
- identify a second optical level measured by a second photodiode that is coupled with a termination of the modulator; and
- identify, based on the first optical level and the second optical level, the minimizing modulator bias that is to minimize the first optical level.

16. The one or more non-transitory computer-readable media of claim 15, wherein the instructions are further to incrementally alter the modulator bias based on a starting modulator bias wherein the data is modulated.

* * * * *